Jan. 3, 1939.  E. W. WEBB  2,142,427
SIDE BEARING
Filed Nov. 5, 1936   2 Sheets-Sheet 1
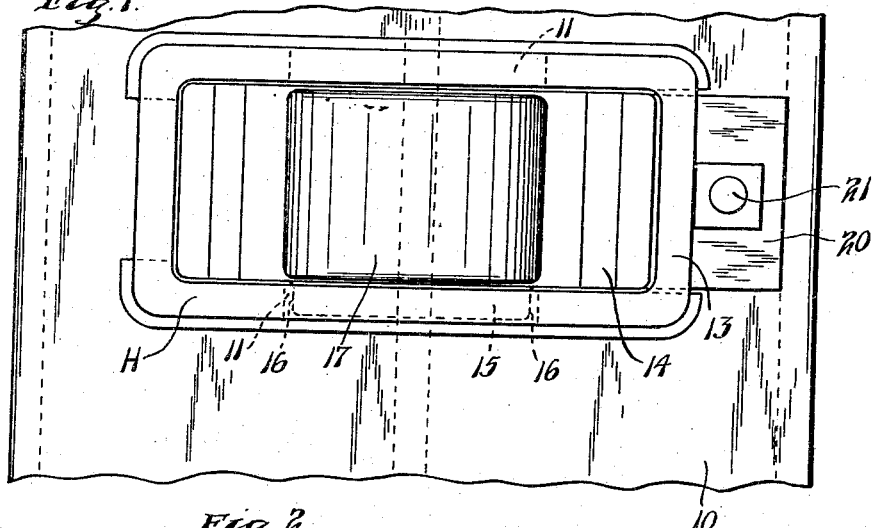
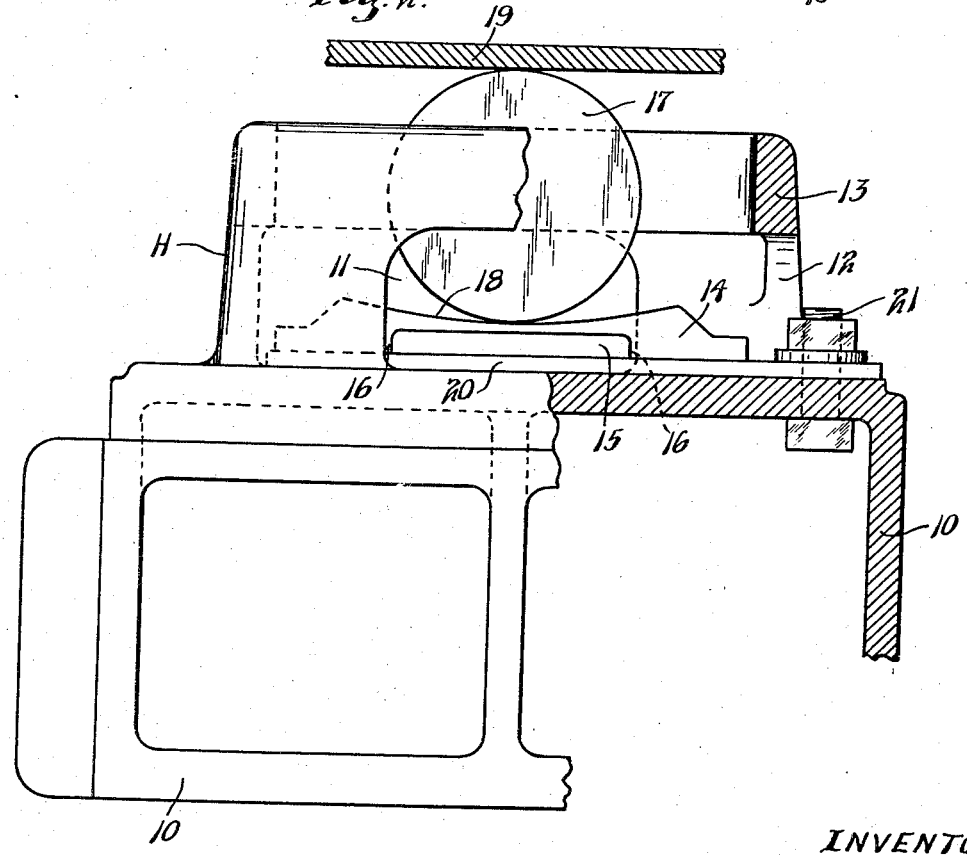
INVENTOR.
EDWIN W. WEBB.
BY HIS ATTORNEYS.
Williamson & Williamson Jan. 3, 1939. E. W. WEBB 2,142,427
SIDE BEARING
Filed Nov. 5, 1936 2 Sheets-Sheet 2
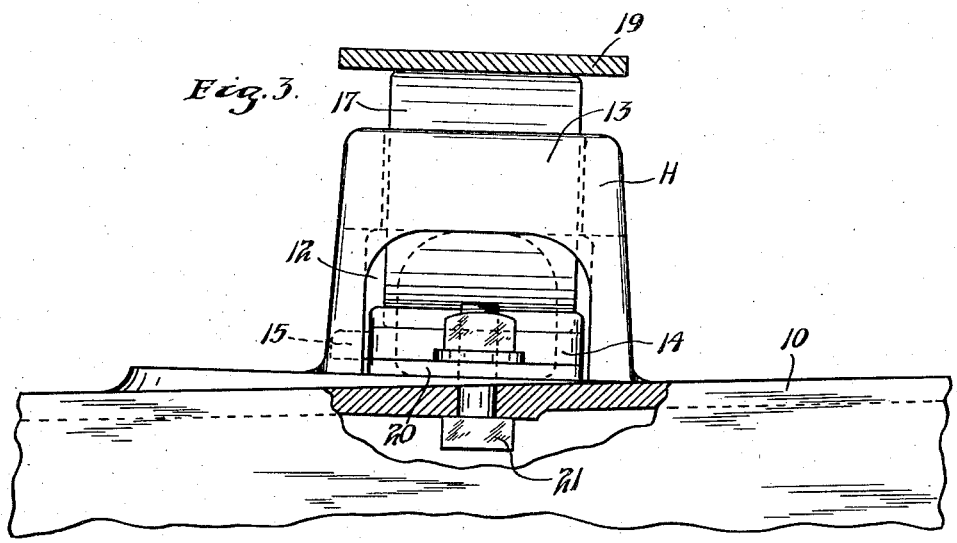
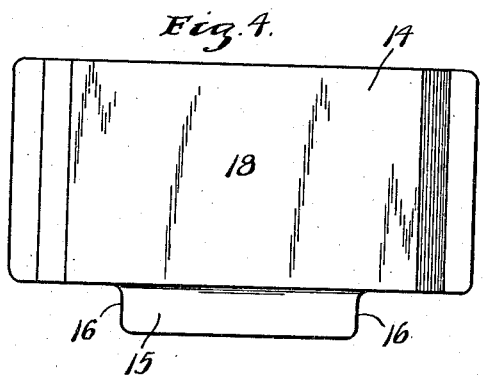
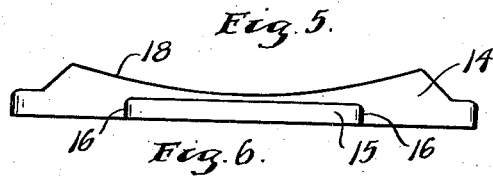
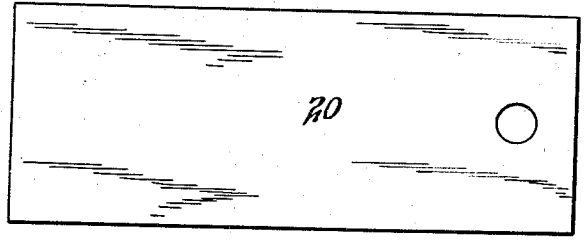
INVENTOR.
EDWIN W. WEBB.
BY HIS ATTORNEYS.
Williamson & Williamson Patented Jan. 3, 1939

2,142,427

UNITED STATES PATENT OFFICE 2,142,427

SIDE BEARING

Edwin W. Webb, Chicago, Ill., assignor to Standard Car Truck Company, Chicago, Ill., a corporation of New Jersey Application November 5, 1936, Serial No. 109,268

1 Claim. (Cl. 308—226)

My invention relates to an improved roller side bearing of that general type which is used principally on railway cars between a car body bolster and a truck bolster, as is well known in the art.

It is an object of my invention to provide a construction whereby the parts may be easily assembled and quickly placed in secured position.

It is a further object of my invention to provide a side bearing construction wherein the bearing tread plate is more securely held against longitudinal movement. This longitudinal movement is induced by pressure from the car body bolster through the bearing upon which it rests to the upper surface of the bearing tread plate and the forces applied against the tread plate are often sufficient to shear the tread plate retaining bolt or bolts used in many of these devices. I have, therefore, provided a construction wherein the tread plate is more strongly secured and is held positively against longitudinal movement.

These and other objects and advantages of the present invention will more fully appear from the following description made in connection with the accompanying drawings, wherein like reference characters refer to the same or similar parts throughout the various views, and, in which:—

Fig. 1 is a plan view thereof with a portion of the truck bolster shown;

Fig. 2 is a side elevation thereof with some of the parts broken away;

Fig. 3 is an end elevation showing the truck bolster broken away and a portion of the body bolster in section;

Fig. 4 is a plan view of the bearing tread plate;

Fig. 5 is a side elevation thereof; and

Fig. 6 is a plan view of one of the shim members.

Referring to the drawings in more detail, the truck bolster 10 is shown provided with an upstanding housing, generally indicated at H, which is formed integrally with said bolster. The side walls of said housing are provided with apertures 11 centrally positioned with respect to the ends of the housing and extending upwardly a substantial distance from the bottom of said housing.

A similarly shaped opening 12 is formed in one or both of the end walls 13 of the housing H and the top of the housing is left open. The open top of the housing is of sufficient size to admit the tread plate 14 which is provided at one side with a tongue-like extension 15 formed integrally with said plate. The tread plate is inserted through the open top of the housing H with the side edge carrying the tongue 15 turned downwardly and, as said tread plate is lowered into the housing, it is twisted into a horizontal position with the tongue-like extension 15 lying in the opening 11 in the side wall of said housing, with a relatively close fit between the ends 16 of said tongue-like extension and the edges of said opening.

A suitable roller bearing 17 is then inserted through the open top of the housing and rests upon the concave upper face 18 of the tread plate 14 to provide a self-centering bearing, such as is well known in the art. The member 19 represents a portion of a car body bolster resting upon the roller bearing 17, as shown in Figs. 2 and 3.

Shims 20, insertable through the end opening 12, are provided to compensate for wear and are shown placed beneath the tread plate 14. In order that several shims may be placed beneath said tread plate, the openings 11 in the sides of the housing are made substantially higher than the thickness of the tongue-like extension 15 in order that the tread plate may be elevated by placing additional shims beneath said tread plate with said tongue-like extension being retained against longitudinal movement by the edges of the aperture 11 in the side wall of the housing H.

The shims 20 are held in position as by a nut and bolt member 21 extending through the truck bolster 10 and the projecting end of the shim. These shim members are sufficiently held in this manner, in view of the fact that they do not receive as much longitudinal strain as does the bearing tread plate 14.

From the drawings and the above description, it will be seen that I have provided a side bearing construction which is extremely simple and is, at the same time, unusually rigid. In former constructions where a nut and bolt or some other removable or movable tread plate locking devices have been used, it has been found that the stresses exerted against the bearing tread plate have been sufficient to break off the locking elements and cause the plate to shift longitudinally. In my construction, however, this is impossible due to the fact that the tread plate is securely held against movement longitudinally in either direction by the housing H which is formed integrally with the truck bolster 10.

Each side wall of the housing may be provided with openings 11, in order that the tread plate may be inserted with the tongue-like extension 15 at either side of said housing.

It will, of course, be understood that various changes may be made in the form, details, arrangement and proportions of the various parts without departing from the scope of the present invention.

What is claimed is:—

A side bearing structure for truck bolsters comprising a housing having an opening in its end, a shim member in the bottom of the said housing and having an end extending through said opening, means rigidly securing said shim member to said bolster, said housing also having openings in its top and side, a bearing tread plate adapted to be inserted through said top opening, an integral tongue-like lateral extension on said tread plate, said tongue-like extension being of a size to closely fit the width of the opening in the side of said housing, and a bearing adapted to rest upon said tread plate, whereby thrust exerted by said bearing upon said tread plate is received by said housing and whereby said shim securing means is relieved of thrust from said bearing.

EDWIN W. WEBB.